Jan. 4, 1944.　　A. LÉNART ET AL　　2,338,447
DRIVING BELT
Filed Sept. 14, 1940

Inventors
Andor Lénart and Joseph Vámos
by Michaelis & Michaelis,
Attys.

Patented Jan. 4, 1944

2,338,447

UNITED STATES PATENT OFFICE 2,338,447

DRIVING BELT

Andor Lénart and Joseph Vámos, Budapest, Hungary; vested in the Alien Property Custodian Application September 14, 1940, Serial No. 356,786
In Hungary October 20, 1939

4 Claims. (Cl. 74—231)

This invention relates to belts for power transmission and more especially to elastic belts. It is an object of this invention to provide an elastic belt of particularly great efficiency in power transmission and which counteracts a tendency of slipping.

In the new belt according to this invention the main body may be an endless band of fabric or a plurality of parallely disposed cords or short lengths of cords, all of them embedded in rubber. Across the two main faces of the belt extend either short strips arranged in spaced relation, the strips on opposite sides being arranged in staggered relation, or a long strip may extend around the belt body in a spiral, its windings being spaced by at least the width of the strip. An elastic covering enveloping the strips and the body forces the strips into the body and thereby imparts to it a slight zigzag section. When the belt is stretched, the body section is almost straightened, but now the strips prevent the covering from being straightened also except in the interstices between two strips or strip windings, and the belt surface then becomes slightly corrugated and uneven, the portions above the strips projecting above the intervening portions and thus minimizing slipping on the pulley, while guaranteeing a perfect power transmission.

In the drawing affixed to this specification and forming part thereof an embodiment of this invention is shown diagrammatically by way of example.

In the drawing—

Figure 1:
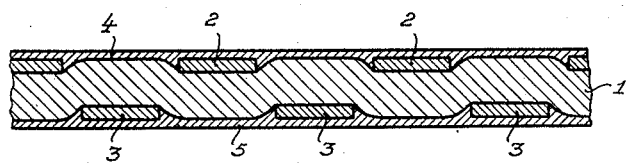
Figure 1 is a vertical longitudinal section view of the unstretched belt.
Figure 2:
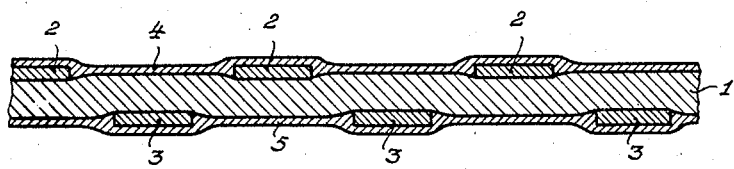
Figure 2 is a similar view of the same belt in the stretched condition thereof.

Referring to the drawing and first to Figs. 1 and 2, I is the body of the belt which may consist of fabric or of longitudinally extending cords or pieces of cord arranged in staggered relation, the whole being embedded in rubber. 2 and 3 are short strips of a length inferior or equal to the width of the belt body which extend across the surface of said body, the strips 2 extending on one, the strips 3 on the opposite side of said body, and the strips on each side being preferably spaced by at least their own width. The strips 2 are arranged in staggered relation relative to the strips 3. 4 and 5 are protecting covering layers consisting of a fabric or individual cords, impregnated with or embedded in rubber. The strips and covering layers are united with the body I by vulcanization under pressure, the strips being forced into the surface layer of the body I which is thus imparted a slight zig-zag section in the longitudinal direction.

When the belt is stretched, the elastic body I, as shown in Fig. 2, owing to the forced change of its longitudinal section exerts outward pressure on the bottom faces of the strips 2 and 3, thereby causing these strips and the protective layer covering to somewhat rise above the belt surface which thus becomes uneven and capable of firmly gripping the pulleys. This change of form of the belt surface, when the belt is stretched, is due to the arrangement of the crosswise extending strips on the surfaces of the elastic inner body in combination with the arrangement of protective layers holding the strips in place and imparting to the belt, when inoperative, smooth surfaces.

We wish it to be understood that we do not wish to be limited to the exact details of the invention as shown and described as various changes will occur to one skilled in the art.

We claim:

1. A driving belt comprising in combination, a stretchable band forming the belt body, said band being formed with depressions extending across said band, strips seated on the bottom of said depressions with the outer surfaces of the strips substantially level with the outer surfaces of the band, and an elastic layer covering said band and the strips embedded therein and presenting a plane outer surface as long as the belt is not stressed in the longitudinal direction.

2. The driving belt of claim 1, in which depressions and strips are arranged on the two sides of the belt in staggered relation.

3. A driving belt comprising a flexible band formed with depressions extending across the band on the inner and outer sides thereof, the depressions on the inner side being staggered with respect to the depressions on the outer side of the band, whereby the band exhibits an undulated contour in its relaxed condition and exhibits a flatter contour when in a longitudinally stressed condition wherein the bottoms of the depressions are displaced toward their sides of the band, strips seated on the bottoms of the depressions, said strips having sufficient thickness to protrude beyond the surfaces of the corresponding sides of the band when the band is longitudinally stressed, and a stretchable and compressible covering enclosing the band and the strips and defining plane inner and outer belt surfaces when the belt is in relaxed condition and defining undulating inner and outer belt surfaces when the belt is in a longitudinally stressed condition.

4. A driving belt according to claim 3, wherein the ends of the strips are spaced from the ends of the depressions, the spaces being filled by the material of the stretchable and compressible covering, and wherein the strips on each side of the band are spaced for at least the width of a strip.

ANDOR LÉNART.
JOSEPH VÁMOS.